April 24, 1956     K. G. WILLIAMS ET AL     2,743,415
GRADIOMETER

Filed Sept. 30, 1946     2 Sheets-Sheet 1

Inventors
K. G. Williams
E. W. Frowe

Attorney

April 24, 1956  K. G. WILLIAMS ET AL  2,743,415
GRADIOMETER
Filed Sept. 30, 1946  2 Sheets-Sheet 2

Inventors
K. G. Williams
E. W. Frowe

By M. O. Hayes
Attorney

United States Patent Office 2,743,415
Patented Apr. 24, 1956

2,743,415

GRADIOMETER

Kenneth G. Williams, Washington, D. C., and Eugene W. Frowe, Houston, Tex.

Application September 30, 1946, Serial No. 700,182

6 Claims. (Cl. 324—43)

(Granted under Title 35, U. S. Code (1952), sec. 266)

This invention relates generally to devices for measuring gradients in magnetic fields and more particularly to a gradiometer adapted to measure the gradients over extremely small distances and to provide direct readings thereof.

The present invention is particularly well suited for measuring gradients in the magnetic fields of ship models for the reason that a distance representing one foot on a vessel such, for example, as a battleship may represent a distance in the order of only one tenth of an inch on the model thereof. Heretofore, gradients in the magnetic fields of ship models generally have been determined by measuring the field strengths at two spaced points in the field by use of a magnetometer and by taking the difference in the field strengths as a measure of the gradient. For example, if longitudinal gradient data is desired at five and one half feet below the keel of a ship, field measurements are made on the model at the equivalent depths of five and six feet below the keel level and the difference in the measurements taken as the gradient at five and one half feet.

The magnetometer method of gradient determination has not been found to be entirely satisfactory in service for the reasons that accurate and repeatable magnetometer measurements are difficult to obtain at small distances and involve tedious and time-consuming operations in establishing settings at different levels. Moreover, to obtain accurate results by this method, it is essential that the magnetic state of the model be constant between measurements at different levels.

In accordance with the arrangement of the present invention, the aforedescribed difficulties of the magnetometer method are obviated by the provision of a gradiometer detector and circuits associated therewith adapted to measure the gradients directly, the detector comprising a small core of high-permeability ferromagnetic material such, for example, as Permalloy and a plurality of pairs of coils wound thereabout. Certain of the circuits associated with the detector and including one of the pairs of coils are employed to set up an A. C. field in the core at a predetermined frequency, the core being driven well into saturation whereby harmonic frequency components are generated in a second pair of coils which are spaced axially on the core and serve to detect gradients in an external field. For this purpose, the second pair of coils are opposedly connected and generate a difference harmonic signal in response to a gradient in the external field, the core becoming saturated sooner on one half cycle of the A. C. field than on the other depending on the direction of the external field, whereby the coils generate unequal harmonic signals to produce the difference signal whose polarity is thus determined by the direction of the external field.

Certain other of the associated circuits include means for generating a phase discriminating signal at a frequency corresponding to that of the harmonic signal and means for mixing these signals in such a manner as to cause a null indicating means to indicate the polarity and relative magnitude of the detected gradient. A third pair of the detector coils and a circuit associated therewith is employed to neutralize the gradient sensed by the signal generating coils by setting up D. C. fields of sufficient strength and polarity to center the null indicating means, the D. C. current required for this purpose being taken as a measure of the gradient and being suitably calibrated in terms of gradient values.

A broad object of the present invention is to provide new and improved means for measuring gradients in magnetic fields in which the measurements are made over small distances.

Another object is to provide a gradiometer adapted to measure magnetic field gradients over small distances and to provide direct readings thereof.

Another object is to provide a gradiometer detector and circuits associated therewith for detecting gradients in external fields and indicating the magnitude and polarity thereof by a null indicating method.

Another object is to provide a gradiometer detector having a small length over which the detector measures whereby the value of the measured gradient corresponds substantially to the gradient value at a desired point in the field.

Another object is to provide a gradiometer detector having axially spaced coils adapted to generate harmonic frequency components which are balanced for phase and amplitude in an external field of zero gradient.

Another object is to provide a gradiometer detector in which the development thereby of false or spurious gradients when the detector is in close proximity to metal objects is minimized.

An additional object is to reduce to a minimum apparent gradients developed by the detector due to the lack of homogeneity of the construction of the core thereof.

Still other objects, features and advantages of the present invention are those implied from or inherent in the novel construction, combination and arrangement of the parts as will become more clearly apparent as the description proceeds, reference being had to the accompanying drawings wherein.

Figure 1:
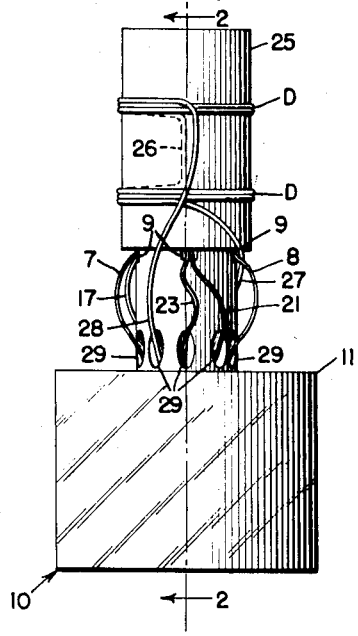
Fig. 1 is a view in elevation of the gradiometer detector according to a preferred embodiment thereof.
Figure 2:
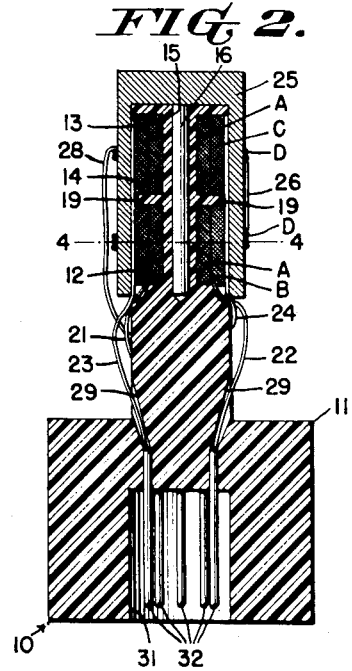
Fig. 2 is a sectional view of the detector as seen along the line 2—2 of Fig. 1.
Figure 3:
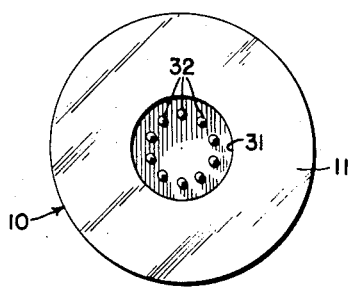
Fig. 3 is a bottom plan view of the detector.
Figure 4:
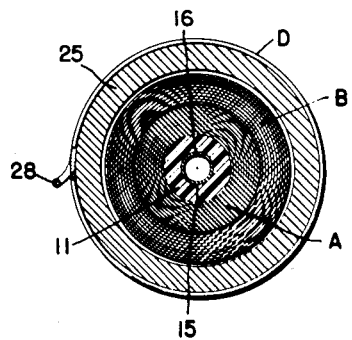
Fig. 4 is a somewhat enlarged sectional view of the coil assembly of the detector as seen along the line 4—4 of Fig. 2.
Figure 5:
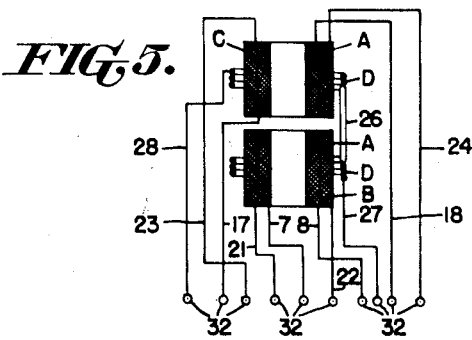
Fig. 5 is a diagrammatic view illustrating the wiring of the coils of the detector.

Referring now to the drawings for a more complete understanding of the invention and more particularly to Figs. 1 to 5, it will be seen that the detector, generally designated by the numeral 10, comprises a block 11 of cylindrical configuration and formed of any suitable insulating material such, for example, as Lucite. The reduced end portion of block 11 is grooved as at 12 and 13 to form a thin shoulder portion 14 disposed therebetween, thereby to form a bobbin or spool for receiving a plurality of windings in fixed spaced relation on the block. The reduced end of the block also is provided with a central bore 15 which extends throughout the length of the bobbin.

A core element 16 is inserted in bore 15 and is formed of a high-permeability, ferromagnetic material such, for example, as Permalloy. Core 16 may be formed into a scroll from a sheet of Permalloy but preferably is formed as a seamless tube in order to minimize apparent magnetic field gradients in the core due to a lack of homogeneity in the structure thereof. It has been found experimentally that appreciable apparent gradients are produced in the detector when a sizable uniform field is applied at right angles to the length thereof and that such gradients are due to lack of homogeneity in the core structure. The apparent gradients also may be substantially eliminated by the use of a short length of Permalloy rod as a compensating bar mounted horizontally near the detector.

A pair of substantially identical coils designated A are wound in the bottom of grooves 12 and 13. Leads 7 and 8 of coil A in groove 12 are brought out of the bobbin by way of a plurality of slots or notches 9 formed in block 11 in communication with groove 12. Leads 17 and 18 of coil A in groove 13 are brought out of the groove by way of a plurality of notches or slots 19 formed in shoulder 14 and thence out of the bobbin by way of notches 9. A second pair of substantially identical coils designated B and C are wound about coils A in grooves 12 and 13, the leads 21, 22 and 23, 24 respectively of these coils being brought out through openings 9 and 19 in the same manner as the leads of coils A whereby a magnetic field shielding cap 25 is adapted to be closely fitted over the reduced end of block 11.

Cap 25 preferably is formed of a shielding material such, for example, as copper and is employed for the purpose of preventing substantially the development of false gradients in core 16 due to magnetic fields set up in metallic objects by the A. C. exciting field for the detector when one end of the detector is moved into close proximity to the objects. Use of the shield tends to reduce somewhat the sensitivity of the pickup coils of the detector to gradients in an external field. Use of the shield, however, renders the detector capable of yielding accurate measurements of the gradients.

A pair of substantially identical coils generally designated D and comprising relatively few turns are wound about shield cap 25 so as to be located adjacent the ends of core 16 respectively, these coils being connected in series opposition as at 26 so as to set up opposing D. C. fields when a D. C. current is caused to flow therethrough to neutralize a gradient in an external field, as will appear more fully hereinafter.

Leads 27, 28 of coils D as well as the leads of coils A, B, and C are each brought through one of plurality of diagonal openings 29 in block 11, these openings communicating with a bore 31 formed in the enlarged end portion of the block. The leads are soldered or otherwise suitably secured or fastened to a plurality of contact pins 32 which may be embedded in the block and project into the bore in suitable spaced relation therein so as to provide sufficient insulation therebetween and such that the pins may be used with an "Amphenol" type socket, if desired.

In a specific application for the detector 10 in measuring longitudinal gradients in the magnetic fields of ship models, it was found that optimum results are obtained in the use of a core 16 whose length is approximately ⅝ inch and whose diameter is in the order of 1/16 inch whereby gradients may be measured over effective distances of less than ¼ inch. The distance over which the detector measures should be a minimum consistent with the sensitivity in order that a minimum smearing or spreading of the gradient take place, i. e., in order that the measured gradients represent substantially point values. It was also found that the neutralizing coils D should be formed of approximately 2½ turns each and should be spaced approximately ½ inch. Furthermore, the shield cap 25 should have a wall thickness in the order of 1/16 inch and a cap thickness of approximately ¼ inch.

Figure 6:
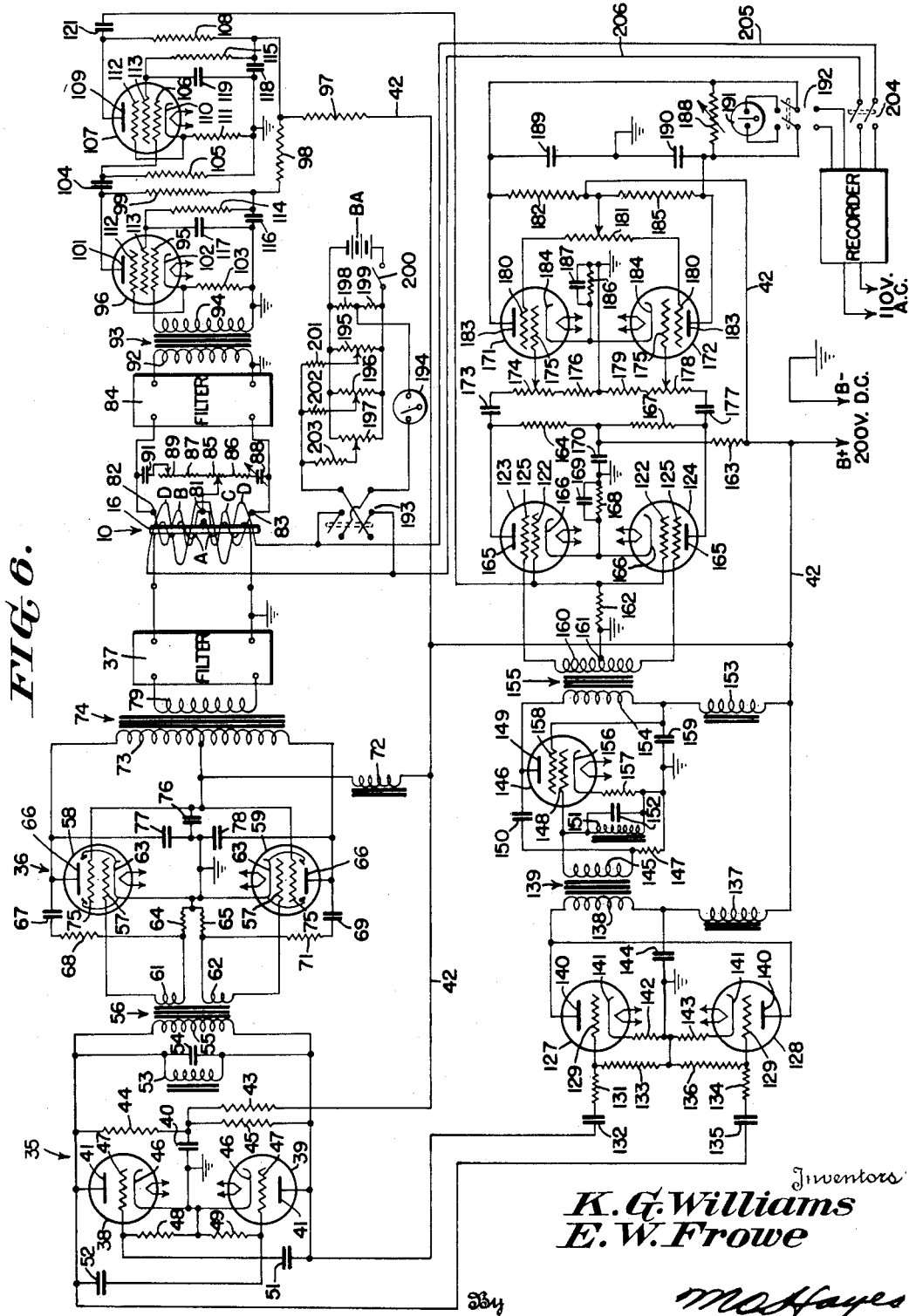
Fig. 6 is a complete electrical diagram of the gradiometer according to the preferred embodiment of the invention.

Referring now to Fig. 6 in which the detector 10 is illustrated in association with certain circuits comprising a complete electrical system for the gradiometer of the present invention, it will be seen that coils A of the detector are excited from a push-pull, negative resistance type oscillator generally designated by the numeral 35, a push-pull buffer amplifier 36 and a filter 37 being interposed between the oscillator and the detector to amplify and pass a predetermined frequency component of the oscillator output respectively. Coils A may be excited by any suitable source of alternating current adapted to set up an A. C. field in the core 16 of the detector at a predetermined frequency such, for example, as 800 c. p. s. and to drive the core well into saturation whereby harmonic frequency components are generated in the external field pickup coils B and C.

Oscillator 35 comprises a pair of conventional triode vacuum tubes 38 and 39 whose plates 41 are supplied from a suitable D. C. source B+—B— by way of conductor 42, resistor 43 and load resistors 44 and 45 respectively, the cathodes 46 of these tubes being connected to ground at the B— side of source B+—B— and a decoupling condenser 49 being connected between ground and the junction of resistors 44 and 45. Cathodes 46 are electrically connected to the control grids 47 of tubes 38 and 39 by resistors 48 and 49 respectively and energy is fed back to these grids from the plates of tubes 39 and 38 respectively by way of condensers 51 and 52. The output of the oscillator appears between plates 41 of tubes 38 and 39 and the frequency of oscillation is controlled by the usual tank or resonant circuit connected therebetween, the tank circuit comprising the iron core inductance coil 53 and condenser 54.

The aforedescribed type of oscillator is well adapted for use in a gradiometer of the type disclosed herein for the reasons that it provides frequency stability and has a low harmonic content in its output, it being understood that the presence of harmonic components in the exciting current for the detector would appear as false gradients in the output of the gradiometer.

The output of the oscillator, which also appears across the primary winding 55 of coupling transformer 56, is applied to the control grids 57 of beam power tubes 58 and 59 of the buffer amplifier 36 by way of secondary windings 61 and 62 respectively of transformer 56, these windings also being connected to the grounded cathodes 63 of tubes 58 and 59 by way of resistors 64 and 65 respectively. Inverse feedback is applied to grids 57 from the plates 66 of their associated tubes 58 and 59 by way of condenser 67 and resistor 68 and condenser 69 and resistor 71 respectively. The plates are supplied from the B+—B— source by way of conductor 42, iron core inductance coil 72, center tap of primary winding 73 of coupling transformer 74 and thence through the winding to the plates, the screen grids 75 of tubes 58 and 59 being connected to the center tap of winding 73 and A. C. bypass condensers 76, 77 and 78 being employed, as in the usual manner.

The output of amplifier 36 appears in secondary winding 79 of transformer 74 and passes through the 800 C. P. S. filter 37, which removes any harmonic frequency components in the exciting current, and thereafter passes through coils A of the detector.

Pickup or search coils B and C generate harmonic frequency components of the exciting current by reason of the change of impedance of the coils of the detector upon saturation of the core 16 thereof, and the pickup coils are connected as at 81 in series opposition whereby difference or gradient harmonic signal components are caused to appear across the output 82—83 of the combination in response to gradients in the external field, the amplitude of the signal components being proportional to the strength of the field and of either polarity or 180 degree phase difference selectively in accordance with the direction of the field. The harmonic signal components are passed through a 1600 C. P. S. filter 84 adapted to pass the second harmonic component of the exciting current only, the second harmonic component being selected for the reason that it contains most of the output energy due to the magnetic field. The second harmonic signal component will be referred to hereinafter as the harmonic signal.

Phase and amplitude differences usually appear in the second harmonic frequency components generated by pickup coils B and C due to physical inequalities thereof. These differences may be large enough to introduce serious errors in the output of the gradiometer. Accordingly, the second harmonic outputs of coils B and C are balanced for phase and amplitude by means of the series connected condenser-resistor network connected thereacross and comprising a potentiometer or an adjustable resistor 85 having a wiper connected to coils B and C at 81, fixed resistors 86 and 87 connected respectively at opposite ends of resistor 85, a variable condenser 88 connected between resistor 86 and output terminal 83, a potentiometer or variable resistor 89 connected to resistor 87 and having a wiper connected to a condenser 91 which is connected on the other side thereof to output terminal 82.

The second harmonic signal at the output of filter 84 appears in primary winding 92 of coupling transformer 93 and causes a like signal to appear in secondary winding 94 thereof, this signal being applied between ground potential and the control grid 95 of amplifier tube 96. Accordingly, this signal is amplified in the plate circuit of the tube which may be traced from B+ potential on conductor 42, resistors 97, 98 and 99, plate 101 and cathode 102 of tube 96, and thence through cathode bias resistor 103 to ground potential on the B— side of source B+—B—. The potential at plate 101 is applied by way of coupling condenser 104 and grid leak 105 to the control grid 106 of an amplifier tube 107 and is further amplified in the plate circuit thereof which may be traced from the B+ potential on conductor 42, resistors 97 and 108, plate 109 and cathode 110 of tube 107, and thence through cathode bias resistor 111 to ground potential at the B— side of D. C. source B+—B—.

Tubes 96 and 107 preferably are conventional vacuum tube pentodes having suppressor grids 112 connected to the cathodes of their respective tubes and having screen grids 113 connected respectively through resistors 114 and 115 to the junctions of resistors 98 and 99 and 97 and 108 respectively, the usual bypass and decoupling condensers 116 and 117 and 118 and 119 being employed with tubes 101 and 107 respectively.

The signal voltage appearing at plate 109 of tube 107 is applied by way of coupling condenser 121 simultaneously to the control grids 122 of a pair of conventional vacuum tubes 123 and 124 which may be pentodes or tetrodes, as shown. These tubes serve as polarity discriminators and are rendered conductive selectively when either of the screen grids 125 thereof has a potential applied thereto in phase with the signal voltage appearing on the control grid associated therewith in the tube individual thereto.

The potential on the screen grids 125 is applied thereto from oscillator 35, the potential being in phase with the output of the oscillator but at twice the frequency thereof. For this purpose, the amplifier output appearing across the plates of tubes 38 and 39 preferably is first amplified by a pair of tubes 127 and 128 and is applied to the control grids 129 thereof, grid 129 of tube 127 being coupled to the plate of tube 38 by way of resistor 131 and condenser 132 and being connected to ground through grid leak resistor 133. Similarly grid 129 of tube 128 is coupled to the plate of tube 39 by way of resistor 134 and condenser 135 and is connected to ground through grid leak resistor 136.

The plate circuits of tubes 127 and 128 may be traced from B+ potential on conductor 42 by way of iron core inductance 137, primary winding 138 of coupling transformer 139 and thence to ground potential by way of plate 140 and cathode 141 of tube 127 and cathode bias resistor 142 in parallel with plate 140 and cathode 141 of tube 128 and cathode bias resistor 143, decoupling condenser 144 being provided as in the usual manner.

By reason of the parallel connection of tubes 127 and 128 which produces rectification of the 800 C. P. S. output of the oscillator, a signal having a 1600 C. P. S. fundamental frequency is caused to appear across secondary winding 145 of transformer 139. This signal is filtered and amplified by means of tube 146 and its associated tank circuit which is tuned to 1600 C. P. S. in order to eliminate harmonic frequency components in the signal. To this end, secondary winding 145 is connected in series with a resistor 147 between ground and the control grid 148 of tube 146, energy is fed back to the grid circuit from plate 149 of the tube by way of condenser 150, and the tank or resonant circuit comprising iron core inductance 151 and condenser 152 and tuned to 1600 C. P. S. is connected between control grid 148 and ground.

The plate circuit of tube 146 may be traced from B+ potential on conductor 42 by way of iron core inductance 153, primary winding 154 of coupling transformer 155, plate 149 and cathode 156 of tube 146 and thence by way of cathode bias resistor 157 to B— at ground potential, the screen grid 158 being connected to the junction of winding 154 and inductance 153 and an A. C. bypass condenser 159 being interposed between the screen grid and ground.

The secondary winding 160 of transformer 155 is connected on the ends thereof to screen grids 125 of discriminator tubes 123 and 124, and the center tap 161 of the winding is grounded, grids 122 also being connected to ground through grid leak resistor 162.

The plate circuits of tubes 123 and 124 may be traced from B+ potential on conductor 42 by way of resistor 163 and thence by way of plate load resistor 164, plate 165 and cathode 166 of tube 123 in parallel with plate load resistor 167, plate 165 and cathode 166 of tube 124, and thence by way of cathode bias resistor 168 in parallel with an A. C. bypass condenser 169 to ground potential, a decoupling condenser 170 being interposed between the plate load resistors 164 and 167 and ground.

The change in potential at plates 165 of tubes 123 and 124 is amplified by buffer amplifier tubes 171 and 172 respectively, the voltage at the plate of tube 123 being applied by way of coupling condenser 173 and potentiometer 174 to the control grid 175 of tube 171 and a grid leak resistor 176 being interposed between the potentiometer and ground. Similarly, the voltage at the plate of tube 124 is applied by way of coupling condenser 177 and potentiometer 178 to the control grid of tube 172, and a grid leak resistor 179 is interposed between potentiometer 178 and ground.

Potential is applied to screen grids 180 of tubes 171 and 172 from B+ potential on conductor 42 by way of potentiometer 181. The plate circuits of tubes 171 and 172 may be traced from B+ potential on conductor 42 by way of plate load resistor 182, plate 183 and cathode 184 of tube 171 in parallel with plate load resistor 185, plate 183 and cathode 184 of tube 172, and thence by way of cathode bias resistor 186 in parallel with A. C. bypass condenser 187 to ground potential at B—.

A variable resistance 188 is connected in parallel with series connected condensers 189 and 190 between the plates of tubes 171 and 172, the junction of the condensers being grounded. The voltage appearing across resistor 188 is applied selectively to a center reading meter 191 or to the recorder by means of the double pole double throw switch 192. The recorder may be similar to the Speedomax recorder, Catalogue Number 8855–1–S, manufactured by Leeds and Northrup Co., Philadelphia, Pennsylvania.

When switch 192 is closed to connect meter 191 in parallel with resistor 188, the meter indicates the polarity of the voltage appearing thereacross and therefore indicates the polarity of the external field sensed by pick up coils B and C. The magnitude of the gradient of the field also is generally indicated by meter 191. A more accurate value of the gradient, however, is obtained by a null method in which the external field gradient is reduced to zero by means of a D. C. field set up by coils D, a D. C. current being supplied to the coils in the proper direction and of a magnitude to restore meter 191 to its center or null position.

For this purpose, coils D are connected to a reversing switch 193 which in turn is connected on one side thereof to an indicating meter 194 in series with a variable voltage source comprising a battery BA and a plurality of potentiometers 195, 196 and 197 connected thereacross, the meter being connected at the junction of series resistors 198 and 199 also connected in parallel with the battery and a switch 200 preferably being interposed between the battery and resistor 199. Potentiometers 195, 196 and 197 are connected by way of resistors 201, 202 and 203 respectively to the other side of switch 192. Either meter 193 or the group of potentiometers 195, 196, and 197 preferably is calibrated such that the meter positions or potentiometer settings read in terms of gradient values of the external field.

When switch 192 is closed in a direction to connect the Specdomax recorder in parallel with resistor 188, a signal current from either one of tubes 171 or 172 flows to the recorder wherein it is inverted and amplified to fire a thyratron which drives the recorder pen motor in one direction. Similarly, a signal current of opposite polarity fires another thyratron in the recorder to drive the motor in the opposite direction. The thyratrons continue to fire until a slide wire operated by the motor adjusts the current, supplied to coils D by way of switch 204 and conductors 205 and 206, sufficiently to reduce the signal current to zero, switch 204 being closed and reversing switch 192 being open.

From the foregoing, the operation of the gradiometer should now be apparent. In the use thereof in measuring the magnetic gradients of ship models the detector unit is placed under the ship model in the position desired and in the case of the null reading method, the field neutralizing current is adjusted to obtain a null reading, the value of the gradient being read either on meter 194 or potentiometers 195, 196 and 197. Or selectively, the gradient of the ship model may be recorded on the Speedomax, or equivalent thereof, by closing the proper switches as previously set forth.

It should now be apparent that a gradiometer has been provided which is well adapted to fulfill the aforestated objects of the invention. Moreover, whereas the invention has been disclosed in particularity with reference to a preferred embodiment which gives satisfactory results, it will be understood by those skilled in the art that other embodiments may be resorted to without departing from the spirit and scope of the invention as defined by the claims appended hereto.

The invention herein described and claimed may be manufactured and used by or for the Government of the United States of America for governmental purposes without the payment of any royalties thereon or therefor.

What is claimed as new and desired to be secured by Letters Patent of the United States is:

1. In a gradiometer of the character disclosed, the combination of means including a pair of oppositely connected gradiometer coils adapted to generate a difference harmonic signal having an amplitude and phase indicative of the magnitude and direction respectively of an external magnetic field, and means for balancing the gradiometer coils for phase and amplitude in an external field of zero gradient, said last named means comprising a potentiometer having the arm thereof connected to the junction of said coils, a resistor and condenser connected in series between one end of said potentiometer and the other end of one of said coils, and a resistor and a variable condenser connected in series between the other end of the potentiometer and the other end of the other one of said coils.

2. In a gradiometer of the character disclosed having a pair of oppositely connected gradiometer coils adapted to generate a difference harmonic signal corresponding to the magnitude and direction of the gradient of an external magnetic field, means for balancing the gradiometer coils for phase and amplitude in an external field of zero gradient comprising, in combination, a first potentiometer having the arm thereof connected to the junction of the coils, a condenser connected on one side thereof to the other end of one of the coils, a second potentiometer having the arm thereof connected to the other side of the condenser and having one end thereof connected to one end of the first potentiometer, and a resistor and a variable condenser connected in series between the other end of the first potentiometer and the other end of the other one of the coils.

3. In a gradiometer of the character disclosed for meaning gradients in the static magnetic field of a ship model, the combination of a pair of oppositely connected gradiometer coils, a pair of coils connected series-aiding, a saturable tubular core having a length approximately twice the distance over which the gradients in said field are to be measured, means forming a bobbin for receiving said core and said pairs of windings in axially spaced relation about the core according to said distance, a magnetic field shielding cap carried by the bobbin for enclosing said coils therewithin, means including said pair of series-aiding coils for setting up an A. C. field within the core adapted to periodically saturate the core whereby a difference harmonic signal is generated by said gradiometer coils in response to a gradient at a selected point in the field of the ship model, and means for detecting the amplitude and phase of said difference harmonic signal.

4. In a gradiometer of the character disclosed for measuring gradients in the static magnetic field of a ship model, a gradiometer detector comprising a pair of oppositely connected gradiometer coils, a pair of coils connected series-aiding, a saturable tubular core having a length approximately twice the distance over which the gradients in said field are to be measured, means forming a bobbin for receiving said core and said pairs of windings in axially spaced relation about the core according to said distance, and a magnetic field shielding cap carried by the bobbin for enclosing said coils therewithin thereby to prevent the generation of spurious gradients in the core when the detector is moved into close proximity with metallic objects.

5. In a gradiometer of the character disclosed for measuring gradients in the static magnetic field of a ship model, a gradiometer detector comprising a first pair of oppositely connected gradiometer coils, a pair of coils connected series-aiding, a saturable tubular core having a length approximately twice the distance over which the gradients in said field are to be measured, means forming a bobbin for receiving said core and said pairs of windings in axially spaced relation about the core according to said distance, a magnetic field shielding cap carried by the bobbin for enclosing said coils therewithin, a second pair of oppositely connected gradiometer coils arranged in axially spaced relation on said cap, and a plurality of terminal pins carried by the bobbin for connection with the free ends of said pairs of coils respectively.

6. In a gradiometer of the character disclosed for measuring gradients in the static magnetic field of a ship model, a gradiometer detector comprising a first pair of oppositely connected gradiometer coils, a pair of coils connected series-aiding, an insulating block of cylindrical configuration having an enlarged counterbored end forming the base of the detector, the other end of said block having a pair of annular grooves therein forming a bobbin for receiving said pairs of coils in axially spaced relation according to the distance over which the gradients in said field are to be measured, a saturable tubular core adapted to be received concentrically of the bobbin coextensively therewith, a nonmagnetic cup-shaped shield of electrically conducting material carried by the bobbin for enclosing said coils therewithin, a second pair of opposedly connected gradiometer coils arranged in predetermined axially spaced relation on said cap, said bobbin having a plurality of lateral openings therein in communication with the counterbore in the base, and a plurality of terminal pins carried by the base within the counterbore therein for connection with the free ends of said coils respectively through said plurality of lateral openings.

References Cited in the file of this patent

UNITED STATES PATENTS

| | | |
|---|---|---|
| 1,863,415 | Rieber | June 14, 1932 |
| 2,047,609 | Antranikian | July 14, 1936 |
| 2,335,117 | Harrison | Nov. 23, 1943 |
| 2,379,716 | Hull | July 3, 1945 |
| 2,383,459 | Beach | Aug. 28, 1945 |
| 2,406,870 | Vacquier | Sept. 3, 1946 |
| 2,407,202 | Vacquier | Sept. 3, 1946 |
| 2,410,039 | Beach | Oct. 29, 1946 |
| 2,414,654 | Meredith | Jan. 21, 1947 |
| 2,418,553 | Irwin | Apr. 8, 1947 |
| 2,426,622 | Laird et al. | Sept. 2, 1947 |